Oct. 15, 1968   H. J. DONALD   3,405,426
APPARATUS FOR THE PREPARATION OF REINFORCED TUBES
Filed Sept. 28, 1964
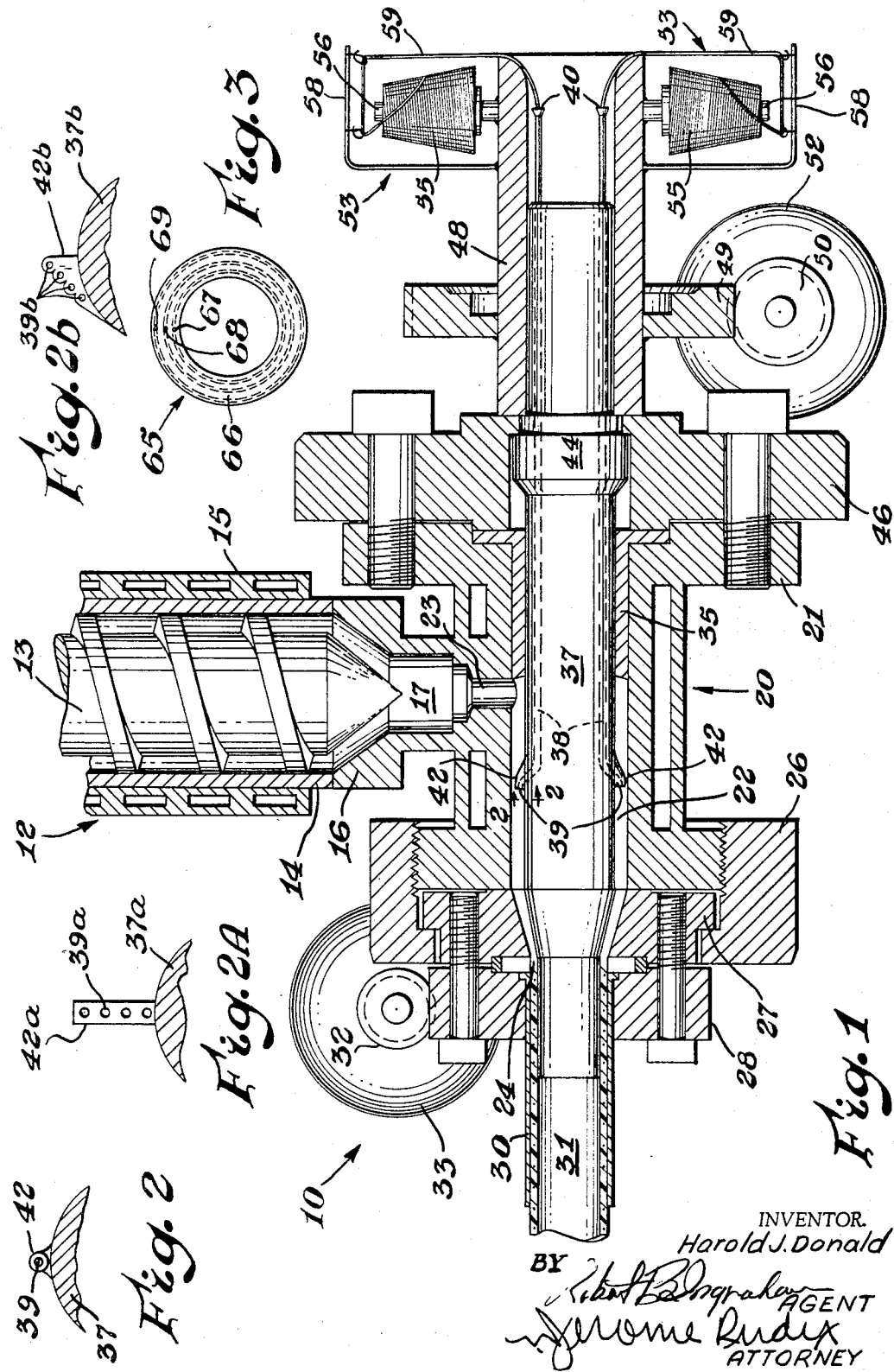
INVENTOR.
Harold J. Donald
BY
AGENT
ATTORNEY United States Patent Office 3,405,426
Patented Oct. 15, 1968

3,405,426
APPARATUS FOR THE PREPARATION OF
REINFORCED TUBES
Harold Jack Donald, Midland, Mich., assignor to The
Dow Chemical Company, Midland, Mich., a corporation of Delaware
Filed Sept. 28, 1964, Ser. No. 399,653
7 Claims. (Cl. 18—13)

ABSTRACT OF THE DISCLOSURE

Oriented filament reinforced pipe is prepared by extrusion employing at least a rotating mandrel to orient the thermoplastic material. As it is extruded, cooling filaments are fed through the mandrel and helically disposed within the thermoplastic melt prior to discharge from the extruder.

---

This invention relates to apparatus for the preparation of filamentary reinforced plastic tubes. It more particularly relates to apparatus for the inclusion of at least one generally helically disposed filamentary strand within a tubular synthetic resinous body.

Frequently, thermoplastic resinous pipes or tubes require reinforcement with a filamentary article such as threads, filaments, and the like in order to provide sufficient strength for desired applications. A wide variety of methods have been used to incorporate such filamentary reinforcing within tubing including multiple extrusions, coating, extrusion of a single tube, overlaying of the reinforcing material and subsequently extruding the second layer of material thereover. Such techniques generally involve a plurality of steps or extremely complicated machinery involving oftentimes more than one extruder and the resultant products are frequently considerably more costly than, for example, extruded tube without reinforcing.

It is an object of this invention to provide an improved apparatus for the production of filament reinforced tubing in a single extrusion operation.

A further object of this invention is to provide an apparatus particularly adapted to encapsulate within the wall of an extruded tube a helically disposed filamentary reinforcing element.

A further object of this invention is to provide apparatus for positioning a plurality of helically disposed filamentary reinforcing elements within the wall of the thermoplastic resinous tube in a single stage extrusion.

These benefits and other advantages in accordance with the present invention are achieved by forming a stream of a heat-plastified thermoplastic resinous material into an annular configuration, while the thermoplastic material is in the annular configuration, inserting therein at least one filamentary reinforcing body, dispensing the body in a generally circular path, so as to dispose the filamentary article in a generally helical manner within the thermoplastic resinous material and subsequently cooling the heat-plastified thermoplastic resinous material below its thermoplastic temperature.

The method employed with the present invention is particularly adapted to be practiced by an apparatus which comprises in cooperative combination a housing defining a cavity, a mandrel disposed within the cavity, the housing defining an inlet passageway adapted to receive a heat-plastified thermoplastic resinous material, the mandrel and the housing so constructed and arranged so as to define a generally annular extrusion orifice, the extrusion orifice and the passageway being so positioned so as to cause thermoplastic resinous material entering the passageway to flow over a material engaging surface disposed on the mandrel, the mandrel being rotatably mounted in the housing and adapted to rotate about an axis of generation of the annular extrusion orifice, the mandrel defining at least one internal filament passageway adapted to receive a filamentary reinforcing article, the filament passageway having a first opening disposed between the housing passageway adapted to receive thermoplastic resinous material and the annular extrusion orifice, a second opening disposed remote from the housing, and means to cause relative rotation between the housing and the mandrel.

Further benefits and advantages in accordance with the present invention will become more apparent from the following specification when taken in connection with the drawing wherein:

FIGURE 1 is a schematic sectional representation of an apparatus in accordance with the invention;

FIGURE 2 is a view of the reinforcing feed port of FIGURE 1 taken along the line 2—2;

FIGURES 2A and 2B are alternate embodiments of feed ports for the practice of the invention;

FIGURE 3 is a schematic sectional view of a reinforced tube in accordance with the invention.

In FIGURE 1 there is schematically illustrated a partial sectional view of apparatus in accordance with the invention generally designated by the reference numeral 10. The apparatus 10 comprises in cooperative combination a means to provide a stream of thermoplastic resinous material or extruder 12, the extruder 12 comprises a screw 13, a barrel 14 having a heating jacket 15, the barrel 14 terminates in a nose piece 16 which defines a passageway 17. The extruder 13 is adapted to deliver heat-plastified thermoplastic material to a die assembly generally designated by the reference numeral 20. The die assembly 20 comprises in cooperative combination a housing 21, the housing 21 defines an internal cavity 22 having a polymer inlet passage 23 in communication with the passageway 17 of the extruder 13. The cavity 22 terminates in an annular extrusion orifice 24 remotely disposed from the passageway 23. Forming the housing 21 is a retaining ring 26 which restrains a die ring 27. The die ring 27 is rigidly affixed to a worm gear 28 which is mounted coaxially therewith. Within the die ring 28 is rigidly positioned a sizing die 30, the sizing die 30 defines an internal passageway 31 which is coaxially disposed with regard to the extrusion orifice 24. The worm gear 28 is in operative engagement with a worm 32 which in turn is driven by a drive means or motor 33. The cavity 22 of the housing 21 has disposed therein a bearing 35 remotely disposed from the extrusion orifice 24. A mandrel 37 is disposed within the cavity 22 and extends entirely therethrough and is positioned coaxially with the cavity 22 to form a generally annular space between the mandrel and the adjacent portion of the housing 21. A plurality of filament passageways 38 are defined by the mandrel 37. The passageways 38 have a discharge opening 39 positioned within the cavity 22 and an inlet opening 40 disposed remote from the cavity 22 and the extrusion orifice 24. The mandrel 37 defines a protuberance 42 about each of the discharge openings 29. A thrust bearing 44 is rigidly affixed to the mandrel 37 and in engagement with a mounting flange 46 adapted to be supported on a frame. A support 48 is rigidly and coaxially affixed to the mandrel 37, a worm gear 49 in turn is rigidly affixed to the support 48, the worm gear 49 in turn is driven by a worm 50 which is operated by a drive means or motor 52. A plurality of filamentary reinforcing supply means 53 are affixed to the support 48. The supply means 53 comprises a filament package 55 supported on a spindle 56 and a thread guide 58. A filamentary reinforcing strand 59 passes from the passage 55 through the thread guide 58 into the openings 40 of the passageways 38 out of the openings 39 into the protuberances 42 and into the thermoplastic resinous material (not shown) flowing within the cavity 22. FIGURE 2 illustrates the configuration of the protuberance 42 and the exit aperture 39 of the passageway 38 on the mandrel 37.

In operation of the embodiment of FIGURE 1, a thermoplastic resinous stream is provided to the passageway 23 by the extruder 13. The material flows into the generally annular cavity defined by the housing 21 and the mandrel 37 and out through the extrusion orifice 24 and the sizing die 30. Filamentary reinforcing articles are fed from packages 55 through the passageways 38 out of the openings 39 into a matrix of heat-plastified thermoplastic resinous material. Rotation of the worm 50 causes the worm gear 49 to rotate and in turn the mandrel 37 thereby discharging the filaments into the annular cavity in a circular path. As the filaments are being removed from the cavity by the flow of the thermoplastic resinous material out of the extrusion orifice 24, the filaments are disposed within the thermoplastic resinous tube in a helical pattern.

In FIGURE 2A there is illustrated an alternate embodiment of a filament passageway termination wherein a protuberance 42a is disposed on a mandrel 37a and a plurality of passageway openings 39a is disposed in a generally radially extending manner to provide distribution of filamentary reinforcing material through the thickness of the wall of the resultant tube.

FIGURE 2B depicts a further arrangement of discharge openings 39b in a protuberance 42b on a mandrel 37b wherein the protuberance has been shaped to permit streamlined flow of the thermoplastic material about ports and ensure individual encapsulation of the filaments when thermoplastic resinous materials having high flow viscosities are utilized.

FIGURE 3 depicts a schematic sectional view of a portion of a pipe generally designated by the reference numeral 65 prepared in accordance with the method and apparatus of the present invention. The pipe 65 comprises a generally hollow cylindrical body 66 having disposed therein a plurality of helically wound filamentary reinforcing articles 67, 68, and 69. The helically wound reinforcing elements are each individually and separately encapsulated within the thermoplastic material of the wall 66. Beneficially in the operation of the apparatus of FIGURE 1 both the outer surface of the annular extrusion orifice as defined by the die piece 27 and the mandrel are rotated in opposite directions in order to impart orientation to the thermoplastic resinous material being extruded if such material benefits from such orientation. Generally by selecting appropriate speeds, the resultant tube may have a combination of linear orientation on the outside (when the die does not rotate), helical orientation wherein the mandrel and the die rotate in the same direction, or helical orientation of opposite hand when the mandrel and the die rotate in opposite directions. No difficulty is encountered in the operation of the apparatus in accordance with the invention. However, care must be taken to prevent the filament passageways from becoming filled with the resinous material being extruded. Therefore, it is desirable to maintain filaments within these passageways at all times when the apparatus is in operation. However, if through carelessness of the operator one of the reinforcing filaments breaks, or the supply runs out and has not been replenished, a new filament is readily inserted by means of threading a new filament into the passageway with the aid of a thin, stiff wire such as copper, brass, or the like while the mandrel is not rotating. The operation can be accomplished while the mandrel is rotating, however in the interest of die preservation it is generally desirable to be assured that all filaments are projecting through the extrusion orifice before the rotation of the mandrel or die is started.

Highly lubricated compositions usually are not desirable when employed in apparatus in accordance with the invention wherein the housing has a smooth cylindrical inner wall. During extrusion of the thermoplastic resinous composition, it is essential that the stream flowing through the generally annular space between the housing and the mandrel be restrained from rotating adjacent the housing surface and adhere sufficiently well to the mandrel that the portion of the stream adjacent the mandrel rotates relative to the portion of the stream adjacent the housing. If highly lubricated compositions are to be employed, usually it is desirable to provide a plurality of longitudinally disposed ribs on the mandrel and the inner surface of the housing in order to develop sufficient shear. Such an expedient generally requires increasing the pressure of the heat-plastified thermoplastic material within the die. For most extrudable thermoplastic resinous materials a conventional polished surface is found eminently satisfactory. If the compositions contain relatively small quantities of a lubricant, a mildly irregular surface on the mandrel and in the inner surface of the housing is satisfactory. Such finishes are readily obtained by abrasive powders of desired coarseness.

Employing an apparatus substantially in accordance with FIGURE 1, polyethylene pipe is readily prepared having disposed therein a rayon filament reinforcement. Examination of the resultant pipe indicates that the filamentary rayon is encapsulated by the polyethylene and no air pockets or voids are adjacent the reinforcement filament. Similar beneficial and advantageous filamentary reinforced structures are prepared utilizing polypropylene, polyvinyl chloride, ethyl cellulose, cellulose acetate, polystyrene, and the like in combination with reinforcements such as rayon, cotton, linen, nylon, copper wire, steel wire, glass filaments, and the like.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for the extrusion of thermoplastic resinous material containing at least one generally helically disposed filamentary reinforcing article disposed therein comprising in cooperative combination, a housing defining a cavity, a mandrel disposed within the cavity, the housing defining an inlet passageway adapted to receive a heat-plastified thermoplastic resinous material, the mandrel and housing so constructed and arranged as to define a generally annular extrusion orifice, the extrusion orifice having a passageway, the extrusion orifice and the passageway being so positioned as to cause thermoplastic resinous material entering the passageway to flow over a material engaging surface disposed on the mandrel, the mandrel being rotatably mounted in the housing and adapted to rotate about an axis of generation of the annular extrusion orifice, the mandrel defining at least one internal filament passageway adapted to receive a filamentary reinforcing article, the filament passageway having a first opening disposed between the housing passageway adapted to receive thermoplastic resinous material and the annular extrusion orifice, a second opening disposed remote from the housing, the first opening of the filament passageway being of a size sufficient to prevent thermoplastic resinous material from passing therethrough when a reinforcement filament is moving from the second opening to the first opening of the filament passageway, the first opening being adapted to disperse a filament passed therethrough to a location above the material engaging surface of the mandrel, and means to cause relative rotation between the housing and the mandrel.

2. The apparatus of claim 1, in cooperative combination with means to supply a stream of heat-plastified thermoplastic resinous material and means to supply a filamentary reinforcing article.

3. The apparatus of claim 1 including a plurality of filament passageways.

4. The apparatus of claim 3 wherein the first opening of filament passageways are disposed at various distances above the material engaging surface of the mandrel.

5. The apparatus of claim 1 including means defining a rotatable surface which forms the outer surface of the extrusion orifice.

6. The apparatus of claim 1 including means to rotate the mandrel and the surface forming the outer portion of the extrusion orifice in opposite directions.

7. An apparatus for the extrusion of thermoplastic resinous material containing a plurality of helically disposed filamentary reinforcing elements disposed therein, the apparatus comprising in cooperative combination a housing defining a cavity, a mandrel disposed within the cavity, the housing defining an inlet passageway adapted to receive a heat plastified thermoplastic resinous material, the mandrel and housing so constructed and arranged as to define a generally annular extrusion orifice, the extrusion orifice having a passageway, the extrusion orifice and the passageway being so positioned as to cause thermoplastic resinous material entering the passageway to flow over a material engaging surface disposed on the mandrel, the mandrel being rotatably mounted in the housing and adapted to rotate about an axis of generation of the annular extrusion orifice, the mandrel defining a plurality of internal filament passageways each adapted to receive a filamentary reinforcing article, each of the filament passageways having a first opening disposed between the housing passageway adapted to receive thermoplastic resinous material and the anular extrusion orifice disposed remote from the housing, the first openings of the filament passageways being of a size sufficient to prevent thermoplastic resinous material from passing therethrough when a reinforcing filament is moved from the second opening to the first opening of the filament passageway, the first opening of the filament passageways being disposed at various distances from the material engaging surface of the mandrel, and means to cause relative rotation between the housing and the mandrel.

References Cited

UNITED STATES PATENTS

| | | |
|---|---|---|
| 1,261,317 | 4/1918 | Tew. |
| 2,046,541 | 7/1936 | Becker. |
| 2,800,683 | 7/1957 | Teichmann. |
| 2,874,411 | 2/1959 | Berquist. |
| 2,887,721 | 5/1959 | Blanchi et al. |
| 3,051,989 | 9/1962 | Mercer. |
| 3,159,877 | 12/1964 | Orsini. |
| 3,281,897 | 11/1966 | Mercer. |
| 3,292,213 | 12/1966 | Donald et al. |
| 2,620,514 | 12/1952 | Sampson et al. |
| 2,674,007 | 4/1954 | Allemann et al. |
| 2,730,762 | 1/1956 | Ballard. |
| 2,800,683 | 7/1957 | Teichmann. |
| 2,887,721 | 5/1959 | Blanchi et al. |
| 3,004,286 | 10/1961 | Klein. |

FOREIGN PATENTS

| | | |
|---|---|---|
| 1,158,887 | 2/1958 | France. |
| 1,235,480 | 5/1960 | France. |

WILLIAM J. STEPHENSON, *Primary Examiner.*